Oct. 26, 1943.  A. J. DALY ET AL  2,332,559

MANUFACTURE OF SHEET MATERIAL

Filed July 17, 1940

INVENTORS
ARTHUR J. DALY.
PHILIP R. HAWTIN.
BERNARD SHAW.
BY
ATTORNEYS.

Patented Oct. 26, 1943

2,332,559

UNITED STATES PATENT OFFICE 2,332,559

MANUFACTURE OF SHEET MATERIAL

Arthur John Daly, Philip Richard Hawtin, and Bernard Shaw, Spondon, near Derby, England, assignors to Celanese Corporation of America, a corporation of Delaware Application July 17, 1940, Serial No. 346,056
In Great Britain August 19, 1939

2 Claims. (Cl. 18—58)

This invention relates to the production of sheet material, especially relatively thick sheet material, of cellulose acetate or like organic film-forming substances for which volatile solvents can be found.

The accompanying drawing illustrates the process of the present invention.

Figure 1:
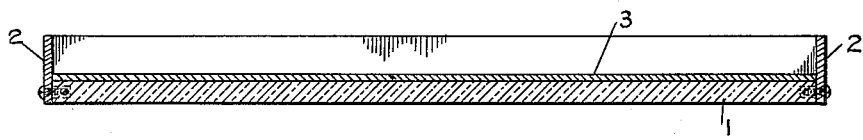
Figure 2:
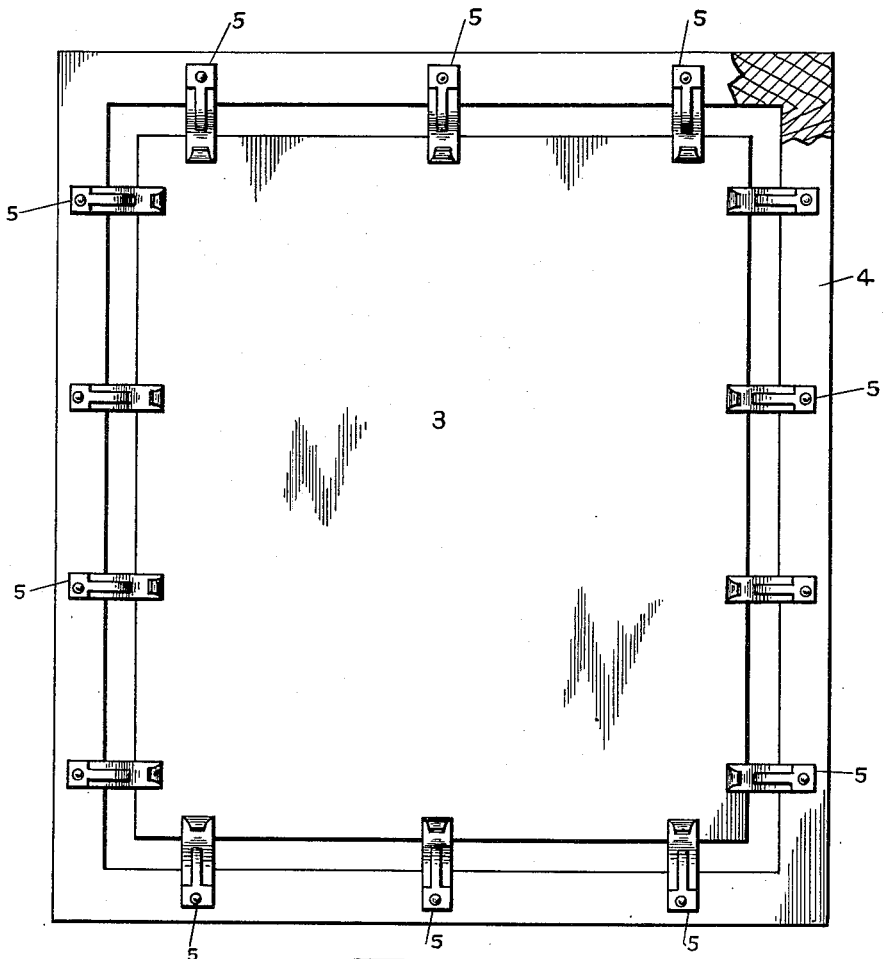

Figure 1 is a vertical section through a form of apparatus suitable for forming novel sheets in accordance with this invention, and Figure 2 is a plan view of a tenter frame for holding a stripped sheet under tension.

In the drawing, 1 is a flat, highly polished glass plate provided with side end pieces 2, of metal or other suitable material to retain the solution of the film-forming substance. Sufficient solution of the film-forming material is poured on to the glass plate 1 to leave a sheet of 0.005 to 0.025" thick after evaporation of most of the solvent. Additional solution of the film-forming material is poured onto the formed thin sheet on the glass plate, and the bulk of the solvent removed. This process is repeated until a sheet 3 of the desired thickness is obtained, whereupon the sheet is stripped from the glass plate 1. The stripped sheet is then placed and held under tension in a tentering device or frame 4 provided with a plurality of clamps 5 for holding the sheet 3.

Sheets of such material which are sufficiently thick to be self-supporting are at present made by forming a composition containing a film-forming substance, a plasticiser and a volatile solvent mixture into a block in a heated press, cutting sheets of the required thickness from the block, "seasoning" the sheets for many days to remove volatile solvent, flattening the sheets to remove warping occurring during the seasoning operation, and finally polishing the sheets to remove knife lines. This process involves elaborate and costly plant in the form of block presses, flattening presses and polishing presses and is somewhat slow and lacking in flexibility. Thus, for instance, to increase the superficial dimensions of sheet materials which it is required to produce may involve laying down completely new presses. It is the primary object of the present invention to provide a process for the production of such sheet materials which is more rapid, less expensive and more flexible in the sense that a change in the superficial dimensions of the material produced can be made at any time at a small additional outlay.

We have found that the object referred to above can be attained by casting a solution of the film-forming substance in a volatile solvent containing an appropriate quantity of plasticiser on to a flat polished glass plate, removing a predetermined proportion of the volatile solvent, stripping the sheet material from the plate and removing residual solvent by exposing the sheet, preferably while it is held under tension in a tentering device, to a drying atmosphere.

In the preferred way of carrying out the invention the sheet is built up to the required thickness from relatively thin layers. Thus, for example, a sheet of 0.05" to 0.1", 0.2" or 0.3" or more can with advantage be built up from successive layers of thickness ranging from less than 0.005 to 0.05", for example between 0.01" and 0.025". Each layer is allowed to dry to the extent of losing the bulk of its volatile solvent before applying the next layer. Successive layers need not be of the same thickness or composition. Thus, for example, pleasing effects may be produced by incorporating metallic powders or other effect materials in the dope from which the intermediate layers are formed. Some of the layers may be colourless and others contain pigments, dyes or other substances adapted to affect the quality of the light transmitted, e. g., polarising it or excluding radiation of a particular range of wave-length, for instance radiation of high actinic value. For some purposes it is of value for one or more outer layers of the composite sheet to be more water-resistant than the inner layers. This can be achieved, for instance, by forming the inner layers of a normal cellulose acetate having an acetyl value of say 52–54% calculated as acetic acid and forming the outer layers of a cellulose acetate of higher acetyl value. Similarly, if the outer layers are required to be less water-resistant than the inner layers they may be made of a cellulose acetate of low acetyl value. The film-forming substances in successive layers may be of quite different constitution. For example the outer layers may be of cellulose acetate butyrate and the inner layers of cellulose acetate.

A flat polished plate or glass provides an excellent casting surface at a relatively low cost. To obtain a similar surface on a metal plate involves an elaborate and costly polishing operation which very few operatives are competent to undertake.

In stripping the sheet material from the glass plate the amount of volatile solvent retained in the material at this stage is of critical importance. If the material contains too much solvent at this stage it is likely to be damaged in removal. If on the other hand too little solvent is present the material is apt to stick to the glass so that chips of glass are removed in stripping. We have found, for instance, that in the production of sheet material having a basis of cellulose acetate and containing 30-40% of a plasticiser such as dimethyl phthalate, stripping after reduction of the content of volatile solvent, e. g., acetone, to below 10% is apt to damage the glass plate, while the sheet material is apt to be damaged if the solvent content be more than about 15%. We prefer to reduce the solvent content to between 10 and 12 or 14% before stripping.

The proportion of plasticiser in the sheet material is also of importance. In general it is preferred to use in the process of the invention a proportion between 30 and 40 to 50% of plasticiser based on the weight of the cellulose acetate. These proportions of plasticiser facilitate drying of the sheet material in the initial stages, possibly by reducing the tendency to the formation of a skin on the surface which hampers evaporation.

Any suitable plasticiser for the film-forming material can be employed, for example in the case of cellulose acetate we may employ dimethyl phthalate, diethyl phthalate, dimethoxy ethyl phthalate, diethoxy ethyl phthalate, methyl phthalyl glycollate, methyl phthalyl methyl glycollate, triacetin, diethyl tartrate, or dibutyl tartrate. Plasticisers which are adapted to increase the fire resistance of the material, for example tricresyl phosphate, triphenyl phosphate, tributyl phosphate, trichloroethyl phosphate and trichlorobutyl phosphate, may also be present, preferably, however, in admixture with plasticisers of greater affinity for cellulose acetate.

When cellulose acetate is employed as the film-forming substance acetone may with advantage be used as the volatile solvent. Other suitable volatile solvents are dioxane and methylene ethylene ether. Solvent mixtures may also be employed, for example mixtures of a latent solvent such as ethylene dichloride or methylene dichloride with ethyl or methyl alcohol or mixtures containing a true solvent such as acetone or dioxane in admixture with a volatile diluent such as benzene or xylene and a low or medium boiling solvent of lower solvent power than the acetone or dioxane, for example, ethyl acetate or methyl or ethyl alcohol. High boiling solvents such as ethyl lactate or diacetone alcohol may also be present. It is preferable, however, to employ a simple volatile solvent and it is one of the advantages of the process of the invention that sheets of excellent clarity can be obtained using a simple solvent such as acetone. This facilitates solvent recovery, which is also facilitated by the simplicity of the process and apparatus. The removal of the bulk of the volatile solvent can be effected at ordinary temperatures or at elevated temperatures, for example 30-40° C. or even higher. When working at relatively high temperatures especial care must be taken to ensure freedom of the air and of the casting surface from dust with a view to avoiding bubble formation.

The solution employed may contain, for example, between 10 and 40% by weight of the cellulose acetate or other film-forming substance. The concentration may, for example, be between 15 and 25% or between 25 and 35%.

The following examples illustrate the invention:

Example I

A glass plate, the upper surface of which is flat and highly polished, is provided with detachable upstanding metal side pieces. A sheet is built up by casting on to the plate, 20-30 layers of dope of the following composition, the parts being by weight:

| | Parts |
|---|---|
| Cellulose acetate | 100 |
| Acetone | 350 |
| Dimethyl phthalate | 40 |

The amount of film forming solution employed to form each layer is such that when the layer is dried, its thickness is between 0.005 and 0.025 inch. Each layer is dried to such an extent that its solvent content is reduced to 11-13% before deposition of the next layer. This drying is effected in a slow current of dust free air at 30-40° C. After the deposition of the last layer, the composite sheet is subjected to the drying atmosphere until its solvent content as a whole is between 11 and 13%. The sheet is then stripped from the glass plate and held under tension in a tentering device by which it is held under slight tension in an atmosphere maintained at 25-30° C., until substantially the whole of the remaining volatile solvent is removed. The sheet is then removed from the tentering device, finished and polished.

Example II

The process is carried out as in Example I, except that instead of cellulose acetate, cellulose acetate-butyrate is used.

Other organic-film-forming substances may be used in the process of the invention, for example other derivatives of cellulose such as cellulose propionate, cellulose butyrate, cellulose acetate-propionate, cellulose acetate stearate, cellulose nitrate, cellulose nitrate-acetate, cellulose nitrate-propionate and cellulose ethers such as ethyl, propyl and benzyl cellulose. Other thermoplastic organic film-forming substances that can be employed include polyvinyl esters, for example polyvinyl acetate, polyvinyl chloride and co-polymers of vinyl acetate and vinyl chloride; polyvinyl ethers, polyvinyl ketones, polymerised esters of the acrylic acid series, for instance polymethyl methacrylate, and other film-forming polymerised unsaturated compounds, for example synthetic resins of the polystyrene class. The process of the invention is of special importance in the production of relatively thick transparent sheet materials suitable for use as window closures and the like, for instance for observation panels in aircraft, land vehicles and gun turrets.

Some of the advantages of the present invention have already been mentioned. Thus, the process of the invention is simple and inexpensive both in capital outlay and in operation. Process and apparatus can rapidly and inexpensively be turned from the production of sheets of one size to sheets of another size. Production of the solution from which the sheet materials are cast is also simple and does not involve the use of complex solvent mixtures or of laborious milling operations. Solvent recovery is simple. In addition the products of the invention have certain advantages over products made by the known method referred to above. Thus they have greater flexibility and clarity and they can be subjected to processes, such as saponification, which modify the surface, without a subsequent polishing operation being necessary to remove knife lines.

Having described our invention, what we desire to secure by Letters Patent is:

1. Process for the production of sheet material suitable for use as light transmitting material in observation panels of aircraft and other vehicles which comprises building up on the flat polished surface of a glass plate a multilayer sheet at least 0.05 inch thick of a cellulose ester containing about 30–50% of its weight of a plasticizer, each layer being formed by the deposition of a layer of a solution of the cellulose ester and plasticizer in a volatile solvent, and being freed from the bulk of its volatile solvent before deposition of the next layer, stripping the composite sheet from the glass while it contains about 10–15% of its weight of the volatile solvent and removing substantially the whole of the remaining volatile solvent while the sheet is held flat.

2. Process for the production of sheet material suitable for use as light transmitting material in observation panels of aircraft and other vehicles which comprises building up on the flat polished surface of a glass plate a multilayer sheet at least 0.05 inch thick of cellulose acetate containing about 30–50% of its weight of a plasticizer, each layer being formed by the deposition of a layer of a solution of the cellulose acetate and plasticizer in acetone, and being freed from the bulk of its acetone before deposition of the next layer, stripping the composite sheet from the glass while it contains about 10–15% of its weight of the acetone and removing substantially the whole of the remaining acetone while the sheet is held flat.

ARTHUR JOHN DALY,
PHILIP RICHARD HAWTIN.
BERNARD SHAW.